US011626589B2

(12) United States Patent
Wang

(10) Patent No.: US 11,626,589 B2
(45) Date of Patent: Apr. 11, 2023

(54) SECONDARY BATTERY AND DEVICE CONTAINING SAME

(71) Applicant: Contemporary Amperex Technology Co., Limited, Ningde (CN)

(72) Inventor: Guangjun Wang, Ningde (CN)

(73) Assignee: Contemporary Amperex Technology Co., Limited, Fujian (CN)

(*) Notice: Subject to any disclaimer, the term of this patent is extended or adjusted under 35 U.S.C. 154(b) by 0 days.

(21) Appl. No.: 17/565,438

(22) Filed: Dec. 29, 2021

(65) Prior Publication Data

US 2022/0123301 A1    Apr. 21, 2022

Related U.S. Application Data

(63) Continuation of application No. PCT/CN2020/128872, filed on Nov. 14, 2020.

(30) Foreign Application Priority Data

Nov. 29, 2019    (CN) .......................... 201911205359.1

(51) Int. Cl.
| | |
|---|---|
| H01M 4/525 | (2010.01) |
| H01M 50/489 | (2021.01) |
| H01M 50/491 | (2021.01) |
| H01M 50/449 | (2021.01) |
| H01M 4/36 | (2006.01) |
| H01M 4/48 | (2010.01) |
| H01M 4/505 | (2010.01) |
| H01M 4/583 | (2010.01) |
| H01M 4/587 | (2010.01) |
| H01M 4/02 | (2006.01) |

(52) U.S. Cl.
CPC .......... *H01M 4/525* (2013.01); *H01M 4/364* (2013.01); *H01M 4/48* (2013.01); *H01M 4/505* (2013.01); *H01M 4/583* (2013.01); *H01M 4/587* (2013.01); *H01M 50/449* (2021.01); *H01M 50/489* (2021.01); *H01M 50/491* (2021.01); *H01M 2004/027* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2014/0242469 A1 | 8/2014 | Yamamoto et al. | |
| 2014/0349180 A1 | 11/2014 | Kim et al. | |
| 2015/0214545 A1 | 7/2015 | Hasegawa et al. | |
| 2019/0148762 A1* | 5/2019 | Torita ................ | H01M 10/0525 |
| | | | 429/209 |

FOREIGN PATENT DOCUMENTS

| | | |
|---|---|---|
| CN | 1577922 A | 2/2005 |
| CN | 1929167 A | 3/2007 |
| CN | 104011924 | 8/2014 |
| CN | 206059513 U | 3/2017 |
| CN | 107785542 A | 3/2018 |
| CN | 108713266 | 10/2018 |
| CN | 108807849 A | 11/2018 |
| CN | 108808068 A | 11/2018 |
| CN | 108878956 | 11/2018 |
| CN | 109980164 A | 7/2019 |
| CN | 110165289 | 8/2019 |
| JP | 2011159467 A | 8/2011 |
| JP | 2012156061 A | 8/2012 |
| JP | 2014067583 A | 4/2014 |
| JP | 2019091630 | 6/2019 |
| KR | 1020060132606 A | 12/2006 |
| WO | 2018155609 A1 | 8/2018 |

OTHER PUBLICATIONS

The First Office Action for Chinese Application No. 201911205359. 1, dated Dec. 24, 2021, 9 pages.
The International search report for PCT Application No. PCT/CN2020/128872, dated Jan. 27, 2021, 18 pages.
Yu Hai-Ying et al. Silicon-graphite Composite Anode Materials for Lithium Ion Batteries. Chemical Journal of Chinese Universities No. 7. Aug. 15, 2006(Aug. 15, 2006) the full text.
The extended European search report for European Application No. 20893864.7, dated May 16, 2022, 5 pages.

* cited by examiner

*Primary Examiner* — Laura Weiner
(74) *Attorney, Agent, or Firm* — East IP P.C.

(57) ABSTRACT

This application discloses a secondary battery and a device containing the secondary battery. A positive active material of the secondary battery includes one or more of lithium nickel cobalt manganese oxide, lithium nickel cobalt aluminum oxide, and a modified material thereof. A negative active material of the secondary battery includes a silicon-oxygen compound and graphite. A separator of the secondary battery includes a substrate and a coating layer. The secondary battery satisfies:

$$7.5 \le \frac{3460}{ED} - \left(D50 - D_C 50 \times 0.75 - \frac{T}{18}\right) \le 11.5,$$

where ED≥270 Wh/Kg, 11 μm≤D50≤18.5 μm, 11 μm≤$D_C$50≤20 μm. The secondary battery according to this application achieves relatively high cycle performance while achieving a relatively high energy density concurrently.

14 Claims, 2 Drawing Sheets

SECONDARY BATTERY AND DEVICE CONTAINING SAME

CROSS-REFERENCE TO RELATED APPLICATIONS

This application is a continuation of International Application No. PCT/CN2020/128872, filed on Nov. 14, 2020, which claims priority to Chinese Patent Application No. 201911205359.1, filed on Nov. 29, 2019 and entitled "SECONDARY BATTERY AND DEVICE CONTAINING SAME", both of which are incorporated herein by reference in their entireties.

TECHNICAL FIELD

This application relates to the technical field of energy storage devices, and in particular, to a secondary battery and a device containing the secondary battery.

BACKGROUND

Due to advantages such as a high energy density and a high operating voltage, no pollution, and no memory effect, secondary batteries represented by a lithium-ion secondary battery have been increasingly applied in various fields such as electronic products and electric vehicles. With the wide application of the secondary batteries, people have put forward higher requirements on an energy density of the secondary batteries. Compared with a graphite negative electrode material that is widely used currently, a silicon-based material has an extremely high theoretical capacity and is considered to be a material of first choice for next-generation secondary batteries of high energy densities. However, in the actual application process of the silicon-based material, due to many disadvantages (such as great changes in volume) of the material that are difficult to overcome, the capacity advantage of the material cannot be exerted. Therefore, a high-energy-density secondary battery that meets market demand is not made available by simply increasing the content of the silicon-based material in the negative electrode.

SUMMARY

Embodiments of this application provide a secondary battery that achieves relatively high cycle performance while achieving a relatively high energy density concurrently, and provide a device that contains the secondary battery.

To achieve the foregoing objective, a first aspect of this application provides a secondary battery including a positive electrode plate, a negative electrode plate, and a separator. The positive electrode plate includes a positive active material. The negative electrode plate includes a negative active material. The separator includes a substrate and a coating layer.

The positive active material includes one or more of lithium nickel cobalt manganese oxide, lithium nickel cobalt aluminum oxide, and a modified material thereof.

The negative active material includes a silicon-oxygen compound and graphite.

The secondary battery satisfies:

$$7.5 \le \frac{3460}{ED} - \left(D50 - D_C 50 \times 0.75 - \frac{T}{18}\right) \le 11.5,$$

where ED≥270 Wh/Kg, 11 µm≤D50≤18.5 µm, 11 µm≤DC50≤20 µm. ED is a weight energy density of the secondary battery, measured in units of Wh/Kg. D50 is a volume average particle size of the negative active material, measured in units of µm. DC50 is a volume average particle size of the graphite, measured in units of µm, and T is a thickness of the substrate of the separator, measured in units of µm.

A second aspect of this application provides a device including the secondary battery according to the first aspect of this application.

Compared with the prior art, this application achieves at least the following beneficial effects:

In the secondary battery according to this application, the negative active material includes the silicon-oxygen compound and the graphite. The weight energy density of the secondary battery, the volume average particle size of the negative active material, the volume average particle size of the graphite, and the thickness of the substrate in the separator satisfy specified relationships, so as to significantly facilitate the exertion of the capacity of the battery and achieve both a relatively high energy density and relatively high cycle performance of the battery. The device according to this application includes the secondary battery, and therefore, has at least the same advantages as the secondary battery.

BRIEF DESCRIPTION OF DRAWINGS

To describe the technical solutions in the embodiments of this application more clearly, the following outlines the drawings used in the embodiments of this application. Apparently, the drawings outlined below are merely a part of embodiments of this application. A person of ordinary skill in the art may derive other drawings from the outlined drawings without making any creative efforts.

DETAILED DESCRIPTION OF EMBODIMENTS

Figure 1:
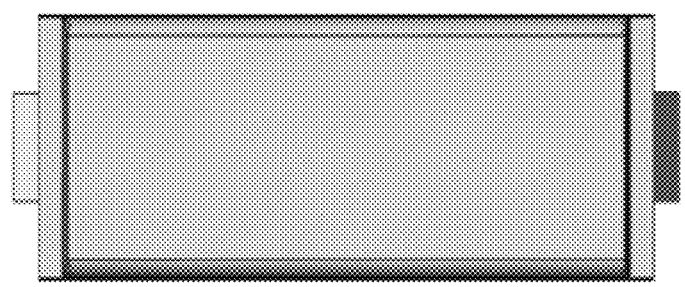
FIG. 1 is a schematic diagram of a secondary battery according to an embodiment.

The following gives a more detailed description of implementations of this application with reference to accompanying drawings and embodiments. The detailed description of the following embodiments and the accompanying drawings are intended to exemplarily describe the principles of this application, but not to limit the scope of this application. Therefore, this application is not limited to the described embodiments.

In the description of this application, unless otherwise specified, "a plurality of" means two or more; the terms such as "upper", "lower", "left", "right", "inner", and "outer" indicating a direction or a position relationship are merely intended for ease or brevity of description of this application, but do not indicate or imply that the device or component referred to must be located in the specified direction or constructed or operated in the specified direction. Therefore, such terms shall not be understood as a limitation on this application. In addition, the terms "first", "second", and "third" are merely intended for descriptive purposes, but are not intended to indicate or imply relative importance. "Perpendicular" is not exactly perpendicular, but within an error tolerance range. "Parallel" is not exactly parallel, but within an error tolerance range.

The directional terms appearing in the following description indicate the directions shown in the drawings, but are not intended to limit specific structures in this application. In the context of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

A first aspect of this application provides a secondary battery. The secondary battery includes a positive electrode plate, a negative electrode plate, a separator, and an electrolytic solution.

The positive electrode plate includes a positive current collector and a positive film that is disposed on at least one surface of the positive current collector and that contains a positive active material. The positive active material includes one or more of a lithium nickel cobalt manganese oxide, a lithium nickel cobalt aluminum oxide, and a modified material thereof.

The negative electrode plate includes a negative current collector and a negative film that is disposed on at least one surface of the negative current collector and that contains a negative active material. The negative active material includes a silicon-oxygen compound and graphite.

The separator includes a substrate and a coating layer.

The secondary battery satisfies:

$$Y = \frac{3460}{ED} - \left(D50 - D_C 50 \times 0.75 - \frac{T}{18}\right),$$

and $7.5 \leq Y \leq 11.5$, $ED \geq 270$ watt-hours per kilogram (Wh/kg), 11 microns (μm)$\leq D50 \leq 18.5$ microns (μm), and 11 μm$\leq m_C 50$ μm20 μm. ED is a weight energy density of the secondary battery, measured in units of Wh/Kg. D50 is a volume average particle size of the negative active material, measured in units of μm. $D_C 50$ is a volume average particle size of the graphite, measured in units of μm. T is a thickness of the substrate of the separator, measured in units of μm.

The silicon-based material has a high theoretical capacity and is an ideal negative active material for next-generation secondary batteries of high energy densities. However, the silicon-based material still face the problem of a large expansion force during charge and discharge. Through research, the inventor finds that electrochemical performance of the material can be exerted maximally by appropriately matching a particle size of the negative active material, a particle size of the silicon-oxygen compound, a particle size of the graphite, a thickness of the substrate of the separator, and the weight energy density of the battery.

When the negative active material includes both the silicon-oxygen compound and the graphite, a larger particle size of the silicon-oxygen compound leads to a higher energy density of the battery, but achieves relatively low kinetic performance and increases polarization during charge and discharge, and therefore, leads to increase of side reactions and deteriorates cycle performance. In this case, more electrolytic solution is needed to maintain a good reaction interface, thereby greatly reducing the energy density accordingly, and hindering effective exertion of high-capacity characteristics of the silicon material. Therefore, the design of the battery needs to concurrently consider factors such as mechanical stress matching between a silicon-oxygen compound particle and a graphite particle, a balance between the kinetic performance and an electrolyte retention amount, and coordination between an electrolyte retention state of the separator and the rebound of the electrode plate.

Through a lot of research, the inventor of this application finds that, when the secondary battery satisfies conditions that Formula Y is within the specified range and that the parameters in the formula are within the specified range, the problem of expansion of the negative electrode plate is well suppressed, and the high-capacity advantage of the silicon-oxygen compound is exerted effectively. Therefore, the secondary battery according to this embodiment of this application can achieve relatively high cycle performance while maintaining a relatively high energy density concurrently.

In the secondary battery according to this embodiment of this application, $7.5 \leq Y \leq 11.5$. In some embodiments, $8 \leq Y \leq 10.5$. For example, Y may be 7.5, 7.6, 8, 8.2, 8.5, 9, 9.5, 10, 10.5, 11.2, 11.5, or the like.

When Y satisfies $8 \leq Y \leq 10.5$, the expansion of the negative electrode plate containing the silicon-oxygen compound is further suppressed, and therefore, the exertion of the capacity of the silicon-oxygen compound is further facilitated, and the cycle life is further increased. Such a secondary battery achieves both a higher energy density and higher cycle performance. In addition, gas generated by the battery is further reduced.

In the secondary battery according to this embodiment of this application, the weight energy density of the secondary battery is $ED \geq 270$ Wh/Kg. In some embodiments, the weight energy density ED of the secondary battery satisfies 270 Wh/Kg$\leq ED \leq 320$ Wh/Kg. When the weight energy density of the secondary battery is designed to fall within such a range, beneficial effects of Formula Y in battery design can be more reflected, and the expansion of the battery can be suppressed. In this way, the secondary battery achieves both a relatively high energy density and relatively high cycle performance.

Negative Electrode Plate

The negative electrode plate includes a negative current collector and a negative film disposed on at least one surface of the negative current collector. For example, the negative current collector has two surfaces opposite to each other in a thickness direction. The negative film is formed on at least one or both of the two surfaces of the negative current collector.

In the secondary battery according to this embodiment of this application, the negative current collector may be made of a material of high electrical conductivity and high mechanical strength. In some embodiments, the negative current collector is a copper foil.

In the secondary battery according to this embodiment of this application, the negative film includes a negative active material. The negative active material includes a silicon-oxygen compound and graphite.

In the secondary battery according to this embodiment of this application, the graphite is one or more of artificial graphite and natural graphite.

In the secondary battery according to this embodiment of this application, in some implementations, the volume average particle size DC50 of the graphite is 11 microns (μm) to 20 microns (μm), and in some implementations, 13 μm to 20 μm. For example, the volume average particle size DC50 of the graphite may be 11 μm, 12 μm, 13 μm, 15 μm, 16 μm, 18 μm, 20 μm, or the like. An appropriate particle size of the graphite not only improves conductivity of lithium ions and electrons of the graphite, but also further improves kinetic performance and volume effect of the silicon-oxygen compound, thereby facilitating exertion of the capacity and increasing the cycle life of the silicon-oxygen compound.

In the secondary battery according to this embodiment of this application, in some implementations, a specific surface area of the graphite may be 1 square meter per gram ($m^2/g$) to 3 square meters per gram ($m^2/g$), and in some implementations, 1.1 $m^2/g$ to 2.5 $m^2/g$. For example, the specific surface area of the graphite may be 1 $m^2/g$, 1.1 $m^2/g$, 1.6 $m^2/g$, 1.9 $m^2/g$, 2.0 $m^2/g$, 2.5 $m^2/g$, 3 $m^2/g$, or the like. An appropriate specific surface area of the graphite can provide a relatively large reactivity area, improve the kinetic performance of the negative electrode plate, ensure few side reactions of the electrolytic solution on the surface of the negative electrode, and increase the cycle capacity retention rate of the battery.

In the secondary battery according to this embodiment of this application, in some implementations, the volume average particle size $D_{Si}50$ of the silicon-oxygen compound is 5 μm to 12 μm, and in some implementations, may be 6 μm to 10 μm. For example, the volume average particle size $D_{Si}50$ of the silicon-oxide compound may be 5 μm, 6 μm, 13 μm, 7 μm, 9 μm, 10 μm, 12 μm, and the like. An appropriate particle size of the silicon-oxygen compound helps to improve its own kinetic performance and volume effect, and makes the material not prone to rupture or break during charge and discharge, thereby facilitating exertion of a high capacity and increasing the cycle life. When the particle size of the silicon-oxide compound is within the foregoing range, few side reactions of the electrolytic solution occur on the surface of the material, thereby reducing the gas generated by the battery and improving the cycle performance of the battery.

In the secondary battery according to this embodiment of this application, in some implementations, a specific surface area of the silicon-oxygen compound is 0.5 $m^2/g$ to 6 $m^2/g$, and in some implementations, may be 1 $m^2/g$ to 3 $m^2/g$. For example, the specific surface area of the silicon-oxygen compound may be 0.5 $m^2/g$, 0.8 $m^2/g$, 1 $m^2/g$, 1.2 $m^2/g$, 2.0 $m^2/g$, 3 $m^2/g$, 3.6 $m^2/g$, 4 $m^2/g$, 6 $m^2/g$, and the like. When the specific surface area of the silicon-oxygen compound is appropriate, many active sites exist on the surface of the particles of the silicon-oxygen compound to improve the reactivity and kinetic performance of the silicon-oxygen compound. In addition, the appropriate specific surface area of the silicon-oxygen compound helps to reduce the side reactions on the negative electrode, reduce the gas generated, and reduce an irreversible capacity, thereby improving the cycle performance of the battery.

In the secondary battery according to this embodiment of this application, in some implementations, the volume average particle size D50 of the negative active material (after the silicon-oxygen compound is mixed with the graphite) is 11 μm to 18.5 μm, and in some implementations, may be 15 μm to 18 μm. For example, the volume average particle size of the negative active material may be 11 μm, 12 μm, 14 μm, 15 μm, 17 μm, 18 μm, 18.5 μm, or the like. When the volume average particle size of the negative active material is too small, the amount of electrolytic solution required by the battery during cycles increases, thereby reducing energy density advantages. When the volume average particle size of the negative active material is too large, the relatively low silicon content in the negative active material may lead to a relatively low gram capacity of the negative active material, thereby affecting the increase of the energy density of the battery. In addition, the negative active material of an appropriate particle size can also reduce an amount of a binder added in the negative film and help to increase the energy density of the battery.

In the secondary battery according to this embodiment of this application, in some implementations, a coating layer may be formed on a part or all of an outer surface of the negative active material (silicon-oxygen compound and/or graphite). The coating layer may include one or more of a polymer, a carbon material, a metal material, and a metal compound. The coating layer can effectively suppress the volume expansion effect of the negative active material. In addition, the coating layer can also serve a protection function to isolate the electrolytic solution, suppress the side reactions of the electrolytic solution on the surface of the negative active material, and protect the surface of the material from being corroded by the electrolytic solution, thereby further improving the capacity and cycle performance of the battery. In some embodiments, the coating layer exists on at least 80% of the surface of the silicon-oxide compound; and/or the coating layer exists on at least 80% of the surface of the graphite. In other words, at least 80% of the total silicon oxide compound or at least 80% of the total graphite is coated with a coating layer; or, at least 80% of an aggregate of the silicon-oxygen compound and the graphite is coated with a coating layer.

In the secondary battery according to this embodiment of this application, in some implementations, a mass ratio of the silicon-oxide compound to the graphite in the negative active material is 0.1 to 0.7, and in some implementations, may be 0.2 to 0.4. For example, the mass ratio of the silicon-oxide compound to the graphite may be 0.1, 0.2, 0.4, 0.5, 0.6, 0.7, or the like. When the mass ratio of the silicon-oxygen compound to the graphite in the negative active material is within the specified range, the energy density of the battery is greatly increased while relatively high cycle performance is achieved concurrently.

In the secondary battery according to this embodiment of this application, the negative film optionally further includes a conductive agent, a binder, and a thickener, the types of which are not specifically limited but may be selected by a person skilled in the art according to actual needs.

For example, the conductive agent applicable to the negative film layer may be one or more of graphite, super-conductive carbon, acetylene black, carbon black, Ketjen black, carbon dots, carbon nanotubes, graphene, and carbon nanofibers. The binder may be one or more of polyacrylic acid (PAA), polyacrylic acid sodium (PAAS), polyvinyl alcohol (PVA), styrene butadiene rubber (SBR), sodium alginate (SA), polymethacrylic acid (PMAA), and carboxymethyl chitosan (CMCS). The thickener may be sodium carboxymethyl cellulose (CMC-Na).

In the secondary battery according to this embodiment of this application, the negative active material may further include other active materials applicable to the negative electrode of the secondary battery. For example, other active materials may be one or more of hard carbon and soft carbon.

The negative electrode plate may be prepared according to a conventional method in this field. For example, a method for preparing the negative electrode plate includes: dispersing the negative active material and optionally conductive carbon, the binder, and the thickener in a solvent such as deionized water to form a homogeneous negative slurry, coating a negative current collector with the negative slurry, and performing steps such as drying and cold calendering to obtain a negative electrode plate.

Positive Electrode Plate

The positive electrode plate includes a positive current collector and a positive film disposed on at least one surface of the positive current collector. For example, the positive current collector has two surfaces opposite to each other in a thickness direction. The positive film is formed on at least one or both of the two surfaces of the positive current collector.

In the secondary battery according to this embodiment of this application, the positive current collector may be made of a material of high electrical conductivity and high mechanical strength. For example, the positive current collector is an aluminum foil.

In the secondary battery according to this embodiment of this application, the positive film contains a positive active material. The positive active material includes one or more of lithium nickel cobalt manganese oxide, lithium nickel cobalt aluminum oxide, and a modified material thereof. Modification includes one or more of coating modification and doping modification.

In some embodiments of this application, the positive active material includes one or more of $Li_aNi_bCo_cM_d$-$M'_eO_fA_g$ and $Li_aNi_bCo_cM_dM'_eO_fA_g$ with a coating layer coated on at least a part of the surface of the $Li_aNi_bCo_cM_d$-$M'_eO_fA_g$, where 0.8≤a≤1.2, 0.5≤b<1, 0<c<1, 0<d<1, 0.8≤a≤1.2, 0.5≤b<1, 0<c<1, 0<d<f the surface Mn and Al, M' is one or more of Zr, Al, Zn, Cu, Cr, Mg, Fe, V, Ti, and B, and A is one or more of N, F, S, and Cl.

The gram capacity of such positive active materials is relatively high, so as to increase the energy density of the battery. Especially, the positive active material whose surface is partially or fully coated with a coating layer not only has a relatively high gram capacity, but also reduces the side reactions on the surface and reduces the gas generated by the battery. When the surface of the positive active material is coated with a coating layer, the coating layer may cover at least 80% of the surface of the material.

In the secondary battery according to this embodiment of this application, in some implementations, at least a part of particles in the positive active material are monocrystal particles. The positive active material formed from the monocrystal particles improves the overall compacted density and ductility of the positive film, and also reduces a contact area between the positive active material and the electrolytic solution, reduces side reactions on the interface, and reduces the gas generated, thereby further improving the cycle performance of the battery.

In the secondary battery according to this embodiment of this application, in some implementations, the volume average particle size $D_a50$ of the positive active material is 8 μm to 12 μm, and in some implementations, may be 9 μm to 11 μm. For example, the volume average particle size $D_a50$ of the positive active material may be 8 μm, 8.5 μm, 9 μm, 9.5 μm, 10 μm, 11 μm, 12 μm, or the like. An appropriate particle size of the positive active material shortens a migration path of lithium ions and electrons in the particles, improves the kinetic performance of the positive electrode, and improves the cycle performance and kinetic performance of the battery. In addition, when the particle size of the positive active material is appropriate, few side reactions of the electrolytic solution occur on the surface of the material, thereby reducing the gas generated of the battery. Moreover, the positive active material of an appropriate particle size can also reduce an amount of a binder added in the positive film and help to increase the energy density of the battery.

In the secondary battery according to this embodiment of this application, the positive film may further include a binder and/or a conductive agent. The types of the binder and the conductive agent are not specifically limited but may be selected by a person skilled in the art according to actual needs. For example, the binder for use in the positive film may be one or more of polyvinylidene difluoride (PVDF), polytetrafluoroethylene (PTFE), polyacrylic acid (PAA), polyvinyl alcohol (PVA), sodium carboxymethyl cellulose (CMC-Na), sodium alginate (SA), polymethacrylic acid (PMAA), and carboxymethyl chitosan (CMCS). The conductive agent may be one or more of graphite, superconductive carbon, acetylene black, carbon black, Ketjen black, carbon dots, carbon nanotubes, graphene, and carbon nanofibers.

The positive electrode plate may be prepared according to a conventional method in this field. For example, a method for preparing the positive electrode plate includes: dispersing the positive active material and optionally the conductive agent and the binder in a solvent (such as N-methylpyrrolidone, NMP for short) to form a homogeneous positive slurry, coating a positive current collector with the positive slurry, and performing steps such as drying and cold calendering to obtain a positive electrode plate.

Separator

In the secondary battery according to this embodiment of this application, the separator serves a function of isolation between the positive electrode plate and the negative electrode plate.

The separator includes a substrate and a coating layer. The substrate may be a film known in the art that is of high chemical stability and mechanical stability. The substrate may be a single-layer film or a multilayer composite film. When the substrate is a multilayer composite film, materials in different layers may be identical or different.

For example, the substrate may include one or more of glass fiber, carbon fiber, and a polymer. In some embodiments, the substrate includes a polymer. That is, the substrate may be a polymer substrate. That is because the polymer substrate is not only of relatively high strength and stability, but also of appropriate toughness, so as to be able to store enough electrolytic solution. In addition, a buffer space released by the polymer substrate helps to meet expansion requirements of a battery cell, reduce the expansion force of the battery cell, and further improve the cycle performance of the battery.

Further, the polymer substrate may include one or more of polyolefin, polyimide, polyurethane, and polyisocyanate. In some embodiments, the polymer substrate may be polyolefin. For example, the material of the substrate may be one or more of polypropylene (PP) and polyethylene (PE).

In some embodiments of this application, the substrate is a polypropylene substrate, a polyethylene substrate, or a two-layer or multilayer composite substrate containing a polypropylene layer and a polyethylene layer. For example, the two-layer or multilayer composite substrate containing a polypropylene layer and a polyethylene layer may be a PP/PE/PP three-layer laminated composite substrate.

In the secondary battery according to this embodiment of this application, in some implementations of this application, the thickness T of the separator substrate is 5 μm to 11 μm, and in some implementations, may be 6 μm to 9 μm. For example, the thickness T of the separator substrate may be 5 μm, 5.5 μm, 6 μm, 9 μm, 9.5 μm, 10 μm, 11 μm, or the like. An appropriate thickness of the substrate not only meets an electrolyte storage requirement and an expansion space requirement of the battery, but also reduces the size of the battery and increases the energy density of the battery.

In the secondary battery according to this embodiment of this application, the coating layer may include, for example, one or more of an inorganic particle coating layer and a polymer coating layer.

The inorganic particle coating layer may include, for example, one or more of aluminum oxide, zirconium oxide, calcium oxide, zinc oxide, magnesium oxide, silicon dioxide, titanium dioxide, calcium carbonate, lithium phosphate, and lithium nitride.

The polymer coating layer may include, for example, one or more of a polyvinylidene fluoride compound, a polyimide compound, a vinylidene fluoride-hexafluoropropylene copolymer, a polyacrylonitrile compound, an acrylonitrile-butadiene copolymer, an acrylonitrile-styrene-butadiene copolymer, polymethyl methacrylate, polymethyl acrylate, polyethyl acrylate, an acrylic-styrene copolymer, a polydimethylsiloxane, sodium polyacrylate, and sodium carboxymethyl cellulose.

The inorganic particle coating layer may include one or more of the foregoing polymers in addition to inorganic particles.

The organic coating layer formed on the surface of the substrate can improve the strength of the separator, and more sufficiently meet the electrolyte storage requirement and the requirement for buffering the expansion force of the battery cell. In addition, the coating layer can make the separator more resistant to heat and penetration, strengthen the bonding at an interface between the separator and the electrode, improve oxidation resistance of the separator, and improve the storage performance of the battery cell.

In the secondary battery according to this embodiment of this application, the inorganic particle coating layer and/or the polymer coating layer are disposed on at least one surface of the substrate. For example, the substrate has two surfaces opposite to each other in the thickness direction. The inorganic particle coating layer and/or the polymer coating layer are disposed on either or both of the two surfaces of the substrate.

In the secondary battery according to this embodiment of this application, in some implementations, a total thickness $T_S$ of the separator (that is, an aggregate thickness of the substrate and the coating layer) satisfies 10 μm≤$T_S$≤6 μm, and in some implementations, 11 μm≤$T_S$≤14 μm. For example, the aggregate thickness of the substrate and the coating layer may be 10 μm, 10.5 μm, 11 μm, 12 μm, 14 μm, 15 μm, 16 μm, or the like. An appropriate total thickness $T_S$ of the separator helps to achieve a relatively high energy density of the battery while effectively exerting the foregoing effects of the substrate and the coating layer.

In the secondary battery according to this embodiment of this application, in some implementations, a porosity of the separator is 35% to 45%, and in some embodiments, may be 38% to 42%. For example, the porosity of the separator is 35%, 36%, 38%, 39%, 41%, 42%, 44%, 45%, or the like. When the porosity of the separator is in an appropriate range, sufficient electrolytic solution can be stored. In addition, a buffer space released by the separator helps to meet the expansion requirements of the battery cell, further reduce the expansion force of the battery cell, and further improve the cycle performance of the battery.

Electrolytic Solution

In the secondary battery according to an embodiment of this application, the electrolytic solution includes an electrolyte salt and a solvent.

In some embodiments, the electrolyte salt may be one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluoro(oxalato) borate), LiBOB (lithium bis(oxalato) borate), $LiPO_2F_2$ (lithium difluorophosphate), LiDFOP (lithium difluoro(bisoxalato)phosphate), and LiTFOP (lithium tetrafluoro(oxalato)phosphate). In some embodiments, the electrolyte salt includes one or more of $LiPF_6$ (lithium hexafluorophosphate) and LiFSI (lithium bis(fluorosulfonyl)imide).

In some embodiments, the solvent may be one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), ethyl methyl sulfone (EMS), and (ethylsulfonyl)ethane (ESE). In some embodiments, the solvent includes one or more of ethylene carbonate (EC), ethyl methyl carbonate (EMC), diethyl carbonate (DEC), dimethyl carbonate (DMC), and ethyl propionate (EP). Such an electrolytic solution is of a relatively high ion conductivity and a relatively low viscosity, and can improve the kinetic performance of the battery.

In the secondary battery according to this embodiment of this application, the electrolytic solution optionally further includes an additive. The type of the additive is not specifically limited, and may be selected according to actual needs. For example, the additive may include a negative film-forming additive, a positive film-forming additive, and additives that can improve some performance of the battery, for example, an additive that improves overcharge performance of the battery, an additive that improves high-temperature performance of the battery, and an additive that improves low-temperature performance of the battery, and the like.

In some embodiments, the additive may one or more of vinylene carbonate (VC), vinyl ethylene carbonate (VEC), fluoroethylene carbonate (FEC), succinonitrile (SN), adiponitrile (ADN), ethylene sulfate (DTD), 1,3-propene sultone (PST), 1,3-propane sultone (PS), tris(trimethylsilane) phosphate (TMSP), and tris(trimethylsilane) borate (TMSB). In some embodiments, the additive includes one or more of fluoroethylene carbonate (FEC), ethylene sulfate (DTD), 1,3-propane sultone (PS), tris(trimethylsilane)phosphate (TMSP), and tris(trimethylsilane) borate (TMSB). Such an electrolytic solution can improve the cycle performance and kinetic performance of the battery.

Structure of the Secondary Battery

The secondary battery may be prepared by using a method known in the art. For example, the method for preparing the secondary battery is: sequentially winding (or stacking) the positive electrode plate, the separator, and the negative electrode plate to obtain a battery cell, where the separator is located between the positive electrode plate and the negative electrode plate to serve a separation function; and then placing the battery cell into an outer package, injecting an electrolytic solution, and performing sealing to obtain a secondary battery.

In the secondary battery according to an embodiment of this application, the outer package may be a hard shell (such as an aluminum shell) or a soft package (such as a pouch-type package, the material of the pouch-type package may be plastic, for example, may be one or more of polypropylene (PP), polybutylene terephthalate (PBT), and polybutylene succinate (PBS)).

Figure 2:
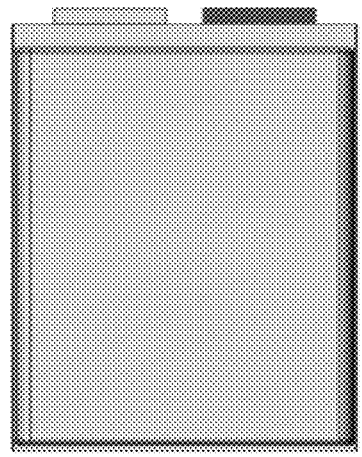
FIG. 2 is a schematic diagram of a secondary battery according to another embodiment.

The shape of the secondary battery is not limited in the embodiments of this application, and may be cylindrical, prismatic or any other shape. FIG. 1 and FIG. 2 show a pouch-type prismatic secondary battery as an example.

In some embodiments, the secondary battery may be assembled into a battery module. The battery module may contain a plurality of secondary batteries, and the specific quantity of the secondary batteries in a battery module may be adjusted according to the application requirements and capacity of the battery module.

In some embodiments, the battery module may be assembled into a battery pack. The quantity of the battery modules contained in a battery pack may be adjusted according to the application requirements and capacity of the battery pack.

The quantity of the battery modules in the battery pack may be adjusted according to the application requirements and capacity of the battery pack.

A second aspect of this application provides a device. The device includes the secondary battery according to the first aspect of this application. The secondary battery may be used as a power supply of the device. In some embodiments, the device may be, but is not limited to, a mobile device (such as a mobile phone or a laptop computer), an electric vehicle (such as a battery electric vehicle, a hybrid electric vehicle, a plug-in hybrid electric vehicle, an electric bicycle, an electric scooter, an electric golf cart, or an electric truck), an electric train, a ship, a satellite system, or an energy storage system.

A secondary battery (cell), a battery module (module), or a battery pack (pack) may be selected for the device according to the application requirements.

Figure 3:
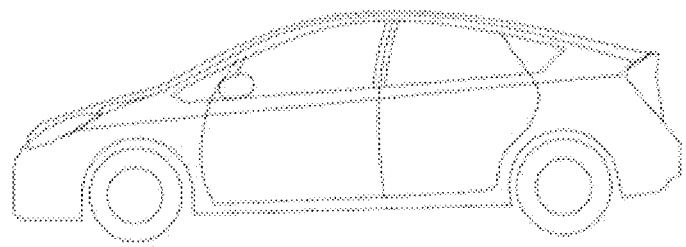
FIG. 3 is a schematic diagram of a device using a secondary battery as a power supply according to an embodiment.

For example, FIG. 3 shows a device that includes a secondary battery prepared according to an embodiment of this application. The device may be a battery electric vehicle, a hybrid electric vehicle, a plug-in hybrid electric vehicle, or the like, and is powered by the secondary battery prepared according to an embodiment of this application.

Test Methods

Volume medium diameters of graphite, a silicon-oxygen compound, a negative active material, and a positive active material have meanings known in the art. The volume average particle size, also known as a median diameter, represents a diameter at a cumulative volume of 50% in particle size distribution. The volume average particle size may be measured by using an instrument and a method known in the art. For example, the volume average particle size may be measured conveniently by using a laser particle size analyzer such as a Mastersizer 2000E laser particle size analyzer of Britain-based Malvern Instruments Ltd. based on the GB/T 19077-2016 particle size distribution laser diffraction method.

The specific surface areas of graphite and a silicon-oxygen compound have meanings known in the art, and may be measured by using an instrument and a method known in the art. For example, a reference standard may be GB/T 19587-2017 *Determination of Specific Surface Area of Solids By Gas Adsorption Using BET Method*. The specific surface area is measured by using a specific surface area analysis and test method by means of nitrogen adsorption, and the value of the specific surface area is calculated by using a Brunauer Emmett Teller (BET) method. The specific surface area analysis and test by means of nitrogen adsorption may be performed by using a Tri Star II 3020 specific surface and porosity analyzer of US-based Micromeritics Company.

The thickness of the substrate of the separator and the total thickness of the separator have the meanings known in the art, and may be measured by using an instrument and a method known in the art, such as a micrometer or a micrometer screw gauge.

An exemplary method for measuring the weight energy density of a battery includes the following steps.

1. Weighing the battery by using an electronic scale to obtain a weight W (unit: kg).

2. Charging the battery at a temperature of 25° C. and at a constant current of ⅓ C until the voltage reaches the highest rated voltage of the battery, then charging the battery at a constant voltage until the current drops to 0.05 C; leaving the battery to stand for 15 minutes, then discharging the battery at a constant current of ⅓ C until the voltage reaches the lowest rated voltage of the battery, and leaving the battery to stand for 5 minutes; measuring the discharge energy of the battery; repeating the foregoing measurement process for 3 times, averaging out the measured values of the discharge energy to obtain an average discharge energy E (unit: Wh) of the battery.

3. Weight energy density of the battery=E/W.

EXAMPLES

The following examples are more detailed descriptions of the content disclosed herein. The examples are merely intended as illustrative descriptions because it is apparent that a person skilled in the art may make various modifications and changes to such examples within the scope of the content disclosed herein. Unless otherwise specified, all fractions, percentages, and ratios mentioned in the following examples are values by weight. All reagents used in the examples are commercially available or can be synthesized according to conventional methods, and can be directly put into use without a need of further processing. All the instruments used in the examples are commercially available.

Example 1

This example provides a secondary battery, which is prepared according to the following method.

Preparing a Positive Electrode Plate

The method for preparing a positive electrode plate includes: mixing lithium nickel cobalt manganese oxide $LiNi_{0.8}Co_{0.1}Mn_{0.1}O_2$ (NCM811), Super P as a conductive agent, and polyvinylidene difluoride (vinylidene fluoride, PVDF for short) as a binder at a mass ratio of 96:2:2, stirring the mixture well in an appropriate amount of N-methylpyrrolidone (N-Methyl pyrrolidone, NMP for short) to form a homogeneous positive slurry; and coating two surfaces of a positive current collector aluminum foil with the positive slurry, and performing drying and cold calendering to obtain a positive electrode plate.

Preparing a Negative Electrode Plate

A method for preparing a negative electrode plate includes: mixing a silicon-oxide compound (SiO) with artificial graphite at a mass ratio (shown Table 1), and then mixing the mixture with Super P as a conductive agent, styrene butadiene rubber (Polymerized Styrene Butadiene Rubber, SBR for short) as a binder, and sodium carboxymethyl cellulose (Carboxymethylcellulose sodium, CMC-Na for short) as a thickener at a mass ratio of 96.2:0.8:1.8:1.2 in an appropriate amount of deionized water, stirring the mixture well to form a homogeneous negative slurry; and coating two surfaces of a negative current collector copper foil with the negative slurry, and performing drying and cold calendering to obtain a negative electrode plate.

Preparing a Separator

Polyethylene (polyethylene, PE for short) is used as a substrate. The thickness T of the substrate is 9 μm. One surface of the substrate is coated with an inorganic coating layer, and the other surface is coated with a polymer coating layer. The total thickness of the separator is 13 μm.

Preparing an Electrolytic Solution

A method for preparing an electrolytic solution includes: mixing ethylene carbonate (Ethylene carbonate, EC for short), ethyl methyl carbonate (Ethyl Methyl Carbonate, EMC for short), and diethyl carbonate (Diethyl Carbonate, DEC for short) at a volume ratio of 1:1:1, adding fluoro ethylene carbonate (Fluoro Ethylene Carbonate, FEC for short), and then evenly dissolving $LiPF_6$ in the foregoing solution to obtain an electrolytic solution, where the concentration of $LiPF_6$ is 1 mol/L, and a mass percent of FEC in the electrolytic solution is 6%.

Preparing a Secondary Battery

A method for preparing a secondary battery includes: sequentially stacking the positive electrode plate, the separator, and the negative electrode plate, and winding them to obtain a battery cell; and then placing the battery cell into an outer package, and injecting an electrolytic solution to obtain a secondary battery. Dimensions of the outer package of the secondary battery: length×width×thickness=308 mm×98 mm×10.7 mm.

Examples 2-25 and Comparative Examples 1-4

These examples differ from Example 1 in that the relevant parameters in the preparation of the positive electrode plate, the negative electrode plate, and the separator are adjusted to obtain the corresponding secondary battery, as detailed in Table 1.

Test Part

Cycle performance test: A test method includes: charging the battery at a temperature of 25° C. in a normal pressure environment and at constant current of 1 C until the voltage reaches 4.2 V, and then charging the battery at a constant voltage until the current is less than or equal to 0.05 milliampere (mA); recording the charge capacity at this time as a $1^{st}$-cycle charge capacity; then discharging the battery at a constant current of 1 C until the voltage reaches 2.8 V, and leaving the battery to stand for 5 minutes; charging the battery at a constant current of 0.1 C until the voltage reaches 1.5 V, and leaving the battery to stand for 5 minutes, thereby completing a cycle; and recording the discharge capacity at this time as an initial capacity of the battery; and performing charge and discharge tests on the battery for 300 cycles according to the foregoing method, and recording the discharge capacity of each cycle:

cycle capacity retention rate (%)=($300^{th}$-cycle discharge capacity/$1^{st}$-cycle discharge capacity)× 100%.

TABLE 1

| | Negative electrode plate | | | | Separator | | Secondary Battery | | |
|---|---|---|---|---|---|---|---|---|---|
| | Weight ratio of SiO to artificial graphite | $D_c50$ (μm) | $D_{Si}50$ (μm) | D50 (μm) | Total thickness $T_s$ (μm) | Substrate thickness T (μm) | ED (Wh/kg) | Y | 1C/1C $300^{th}$-cycle capacity retention rate |
| Example 1 | 0.111 | 18.0 | 7.0 | 18.4 | 14.0 | 9.0 | 288.89 | 7.58 | 95.0 |
| Example 2 | 0.176 | 18.0 | 7.0 | 17.9 | 14.0 | 9.0 | 292.16 | 7.94 | 95.8 |
| Example 3 | 0.250 | 18.0 | 7.0 | 17.5 | 14.0 | 9.0 | 295.83 | 8.20 | 96.0 |
| Example 4 | 0.333 | 18.0 | 7.0 | 17.0 | 14.0 | 9.0 | 300.00 | 8.53 | 97.0 |
| Example 5 | 0.338 | 18.0 | 7.0 | 16.8 | 14.0 | 9.0 | 300.24 | 8.72 | 96.8 |
| Example 6 | 0.341 | 18.0 | 7.0 | 16.2 | 14.0 | 9.0 | 300.36 | 9.32 | 96.5 |
| Example 7 | 0.343 | 18.0 | 7.0 | 15.6 | 14.0 | 9.0 | 300.48 | 9.91 | 96.3 |
| Example 8 | 0.345 | 18.0 | 7.0 | 15.2 | 14.0 | 9.0 | 300.56 | 10.31 | 96.3 |
| Example 9 | 0.346 | 18.0 | 7.0 | 14.8 | 14.0 | 9.0 | 300.64 | 10.71 | 95.7 |
| Example 10 | 0.349 | 18.0 | 7.0 | 14.0 | 14.0 | 9.0 | 300.80 | 11.50 | 95.2 |
| Example 11 | 0.667 | 18.0 | 7.0 | 13.9 | 14.0 | 9.0 | 316.67 | 11.03 | 91.0 |
| Example 12 | 0.333 | 17.0 | 7.0 | 15.1 | 14.0 | 9.0 | 300.00 | 9.67 | 95.7 |
| Example 13 | 0.333 | 15.0 | 7.0 | 13.3 | 14.0 | 9.0 | 300.00 | 9.95 | 95.6 |
| Example 14 | 0.333 | 13.0 | 7.0 | 11.6 | 14.0 | 9.0 | 300.00 | 10.23 | 95.4 |
| Example 15 | 0.333 | 11.0 | 7.0 | 9.8 | 14.0 | 9.0 | 300.00 | 10.51 | 95.0 |
| Example 16 | 0.333 | 18.0 | 5.5 | 15.6 | 14.0 | 9.0 | 300.00 | 9.98 | 95.2 |
| Example 17 | 0.333 | 18.0 | 6.0 | 15.6 | 14.0 | 9.0 | 300.00 | 9.93 | 95.1 |
| Example 18 | 0.333 | 18.0 | 6.5 | 15.7 | 14.0 | 9.0 | 300.00 | 9.88 | 95.0 |
| Example 19 | 0.333 | 18.0 | 7.8 | 15.8 | 14.0 | 9.0 | 300.00 | 9.75 | 94.8 |
| Example 20 | 0.333 | 18.0 | 8.6 | 15.9 | 14.0 | 9.0 | 300.00 | 9.67 | 94.0 |
| Example 21 | 0.333 | 18.0 | 7.0 | 17.0 | 12.0 | 7.0 | 300.60 | 8.40 | 95.7 |
| Example 22 | 0.333 | 18.0 | 7.0 | 17.0 | 12.5 | 7.5 | 300.45 | 8.43 | 95.8 |
| Example 23 | 0.333 | 18.0 | 7.0 | 17.0 | 13.3 | 8.3 | 300.21 | 8.49 | 96.1 |
| Example 24 | 0.333 | 18.0 | 7.0 | 17.0 | 15.0 | 10.0 | 299.70 | 8.60 | 96.5 |

TABLE 1-continued

| | Negative electrode plate | | | | Separator | | Secondary Battery | | |
|---|---|---|---|---|---|---|---|---|---|
| | Weight ratio of SiO to artificial graphite | $D_C50$ (μm) | $D_{Si}50$ (μm) | D50 (μm) | Total thickness $T_s$ (μm) | Substrate thickness T (μm) | ED (Wh/kg) | Y | 1C/1C 300$^{th}$-cycle capacity retention rate |
| Example 25 | 0.333 | 18.0 | 7.0 | 17.0 | 16.0 | 11.0 | 299.40 | 8.67 | 96.0 |
| Comparative Example 1 | 0.333 | 20.0 | 7.0 | 19.8 | 14 | 9.0 | 300.00 | 7.23 | 90.0 |
| Comparative Example 2 | 0.538 | 11.0 | 6.0 | 8.0 | 14 | 9.0 | 310.26 | 11.90 | 89.0 |

As can be learned from the comparison between Examples 1~25 and Comparative Examples 1~2, when the secondary battery satisfies the condition that the particle size of the negative active material and the Y value are both within the specified ranges, the secondary battery can maintain a relatively high energy density while achieving relatively high cycle performance concurrently.

As can be learned from the test results of Examples 4 and 12~20, when the volume average particle sizes of the graphite and the silicon-oxygen compound in the negative active material of the secondary battery are within appropriate ranges, the cycle performance of the secondary battery can be further enhanced.

As can be learned from the test results of Embodiments 4 and 21~25, when the thickness of the substrate of the separator in the secondary battery is within an appropriate range, the energy density and the cycle performance of the secondary battery can be further enhanced.

Some exemplary embodiments of the present invention are provided as follows.

Embodiment 1. A secondary battery, comprising a positive electrode plate, a negative electrode plate, and a separator, the positive electrode plate comprises a positive active material, the negative electrode plate comprises a negative active material, and the separator comprises a substrate and a coating layer, wherein
the positive active material comprises one or more of lithium nickel cobalt manganese oxide, lithium nickel cobalt aluminum oxide, and a modified material thereof;
the negative active material comprises a silicon-oxygen compound and graphite; and
the secondary battery satisfies:

$$7.5 \le \frac{3460}{ED} - \left(D50 - D_C50 \times 0.75 - \frac{T}{18}\right) \le 11.5,$$

where
ED≥270 Wh/Kg, 11 μm≤D50≤18.5 μm, 11 μm≤$D_C$50≤20 μm; and
ED is a weight energy density of the secondary battery, measured in units of Wh/Kg;
D50 is a volume average particle size of the negative active material, measured in units of μm,
$D_C$50 is a volume average particle size of the graphite, measured in units of μm, and
T is a thickness of the substrate of the separator, measured in units of μm.

Embodiment 2. The secondary battery according to embodiment 1, wherein the secondary battery satisfies:

$$8 \le \frac{3460}{ED} - \left(D50 - D_C50 \times 0.75 - \frac{T}{18}\right) \le 10.5.$$

Embodiment 3. The secondary battery according to embodiment 1 or 2, wherein the secondary battery further satisfies one or more of the following conditions (1) to (5):
(1) 270 Wh/Kg≤ED≤320 Wh/Kg;
(2) 15 μm≤D50≤18 μm;
(3) 13 μm≤$D_C$50≤20 μm;
(4) the volume average particle size $D_{Si}$50 of the silicon-oxygen compound satisfies 5 μm≤$D_{Si}$50≤12 μm, and preferably, 6 μm≤$D_{Si}$50≤10 μm; and
(5) a mass ratio of the silicon-oxygen compound to the graphite is 0.1 to 0.7, and optionally, 0.2 to 0.4.

Embodiment 4. The secondary battery according to any one of embodiments 1 to 3, wherein 5 μm≤T≤11 μm, and preferably, 6 μm≤T≤9 μm.

Embodiment 5. The secondary battery according to any one of embodiments 1 to 4, wherein a porosity of the separator is 35% to 45%, and optionally, 38% to 42%.

Embodiment 6. The secondary battery according to any one of embodiments 1 to 5, wherein a total thickness TS of the separator satisfies: 10 μm≤$T_S$≤16 μm, and preferably, 11 μm≤$T_S$≤14 μm.

Embodiment 7. The secondary battery according to any one of embodiments 1 to 6, wherein the graphite is one or more of artificial graphite and natural graphite.

Embodiment 8. The secondary battery according to any one of embodiments 1 to 7, wherein the positive active material comprises one or more of $Li_aNi_bCo_cM'_eO_fA_g$ or $Li_aNi_bCo_cM_dM'_eO_fA_g$ with a coating layer coated on at least a part of the surface of the $Li_aNi_bCo_cM_dM'_eO_fA_g$, wherein 0.8≤a≤1.2, 0.5≤b<1, 0<c<1, 0<d<1, 0≤e≤0.1, 1≤f≤2, and 0≤g≤1, M is one or more of Mn and Al, M' is one or more of Zr, Al, Zn, Cu, Cr, Mg, Fe, V, Ti, and B, and A is one or more of N, F, S, and Cl.

Embodiment 9. The secondary battery according to any one of embodiments 1 to 8, wherein at least a part of particles in the positive active material are monocrystal particles.

Embodiment 10. The secondary battery according to any one of embodiments 1 to 9, wherein a volume average particle size Da50 of the positive active material satisfies: 8 μm≤$D_a$50≤12 μm, and optionally, 9 μm≤$D_a$50≤11 μm.

Embodiment 11. A device, comprising the secondary battery according to any one of embodiments 1 to 10.

Although this application has been described with reference to exemplary embodiments, various improvements may be made to the embodiments without departing from the scope of this application, and the parts therein may be replaced with equivalents. Particularly, to the extent that no structural conflict exists, various technical features mentioned in various embodiments can be combined in any manner. This application is not limited to the specific embodiments disclosed herein, but includes all technical solutions falling within the scope of the claims.

What is claimed is:

1. A secondary battery, comprising a positive electrode plate, a negative electrode plate, and a separator, the positive electrode plate comprises a positive active material, the negative electrode plate comprises a negative active material, and the separator comprises a substrate and a coating layer, with the separator comprising the substrate and the coating layer having a thickness $T_S$ of 10 μm≤$T_S$≤16 μm, wherein the coating layer is selected from the group consisting of an inorganic particle coating layer and a polymer coating layer, and wherein the inorganic particle coating layer is selected from the group consisting of aluminum oxide, zirconium oxide, calcium oxide, zinc oxide, magnesium oxide, silicon dioxide, titanium dioxide, calcium carbonate, lithium phosphate, and lithium nitride, and the polymer coating layer is selected from the group consisting of a polyvinylidene fluoride compound, a polyimide compound, a vinylidene fluoride-hexafluoropropylene copolymer, a polyacrylonitrile compound, an acrylonitrile-butadiene copolymer, an acrylonitrile-styrene-butadiene copolymer, polymethyl methacrylate, polymethyl acrylate, polyethyl acrylate, an acrylic-styrene copolymer, a polydimethylsiloxane, sodium polyacrylate, and sodium carboxymethyl cellulose, wherein the inorganic particle coating layer and/or the polymer coating layer are disposed on either or both of the two surfaces of the substrate, wherein the positive active material is selected from the group consisting of lithium nickel cobalt manganese oxide, and lithium nickel cobalt aluminum oxide, and wherein the positive active material is selected from the group consisting of $Li_aNi_bCo_cM_dM'_eO_fA_g$, wherein 0.8≤a≤1.2, 0.5≤b<1, 0<c<1, 0<d<1, 0≤e≤0.1, 1≤f≤2, and 0≤g≤1, M is Mn, M' is selected from the group consisting of Zr, Al, Zn, Cu, Cr, Mg, Fe, V, Ti, and B, and A is selected from the group consisting of N, F, S, and Cl;

the negative active material is silicon-oxygen compound particle and graphite; and the secondary battery satisfies:

$$7.5 \leq \frac{3460}{ED} - \left(D50 - D_C50 \times 0.75 - \frac{T}{18}\right) \leq 11.5,$$

where
270 Wh/Kg≤ED≤320 Wh/Kg, 11 μm≤D50≤18.5 μm, 11 μm≤$D_c$50≤20 μm, T is from 5 μm to 11 μm; and ED is a weight energy density of the secondary battery, measured in units of Wh/Kg;

D50 is a volume average particle size of the negative active material, measured in units of μm, $D_c$50 is a volume average particle size of the graphite, measured in units of μm, and T is a thickness of the substrate of the separator, measured in units of μm.

2. The secondary battery according to claim 1, wherein the secondary battery satisfies:

$$8 \leq \frac{3460}{ED} - \left(D50 - D_C50 \times 0.75 - \frac{T}{18}\right) \leq 10.5.$$

3. The secondary battery according to claim 1, wherein the secondary battery further satisfies one or more of the following conditions (2) to (5):

(2) 15 μm≤D50≤18 μm;

(3) 13 μm≤$D_c$50≤20 μm;

(4) the volume average particle size $D_{Si}$50 of the silicon-oxygen compound particle satisfies 5 μm≤$D_{Si}$50≤12 μm; and (5) a mass ratio of the silicon-oxygen compound particle to the graphite is 0.1 to 0.7.

4. The secondary battery according to claim 3, wherein the volume average particle size $D_{Si}$50 of the silicon-oxygen compound particle satisfies 6 μm≤$D_{Si}$50≤10 μm.

5. The secondary battery according to claim 3, wherein the mass ratio of the silicon-oxygen compound particle to the graphite is 0.2 to 0.4.

6. The secondary battery according to claim 1, wherein a porosity of the separator is 35% to 45%.

7. The secondary battery according to claim 6, wherein a porosity of the separator is 38% to 42%.

8. The secondary battery according to claim 1, wherein the negative active material comprising graphite is selected from the group consisting of artificial graphite and natural graphite.

9. The secondary battery according to claim 1, wherein the positive active material comprises particles where at least some part of particles are monocrystal particles.

10. The secondary battery according to claim 9, wherein the positive active material has a volume average particle size $D_a$50 of satisfying: 8 μm≤$D_a$50≤12 μm.

11. The secondary battery according to claim 10, wherein the positive active material has a volume average particle size $D_a$50 of satisfying: 9 μm≤$D_a$50≤11 μm.

12. The secondary battery according to claim 1, wherein 6 μm≤T≤9 μm.

13. The secondary battery according to claim 1, wherein a total thickness $T_S$ of the separator satisfies 11 μm≤$T_S$≤14 μm.

14. A device, comprising a secondary battery, wherein the secondary battery comprises a positive electrode plate, a negative electrode plate, and a separator, the positive electrode plate comprises a positive active material, the negative electrode plate comprises a negative active material, and the separator comprises a substrate and a coating layer, with the separator comprising the substrate and the coating layer having a thickness $T_S$ of 10 μm≤$T_S$≤16 μm, wherein the coating layer is selected from the group consisting of an inorganic particle coating layer and a polymer coating layer, and wherein the inorganic particle coating layer is selected from the group consisting of aluminum oxide, zirconium oxide, calcium oxide, zinc oxide, magnesium oxide, silicon dioxide, titanium dioxide, calcium carbonate, lithium phosphate, and lithium nitride, and the polymer coating layer is selected from the group consisting of a polyvinylidene fluoride compound, a polyimide compound, a vinylidene fluoride-hexafluoropropylene copolymer, a polyacrylonitrile compound, an acrylonitrile-butadiene copolymer, an acrylonitrile-styrene-butadiene copolymer, polymethyl methacrylate, polymethyl acrylate, polyethyl acrylate, an acrylic-styrene copolymer, a polydimethylsiloxane, sodium polyacrylate, and sodium carboxymethyl cellulose, wherein the inorganic particle coating layer and/or the polymer coating layer are disposed on either or both of the two surfaces of the substrate, wherein the positive active material is selected from the group consisting of lithium nickel cobalt manganese oxide, and lithium nickel cobalt aluminum oxide, and wherein the positive active material is selected from the group consisting of $Li_aNi_bCo_cM_dM'_eO_fA_g$, wherein $0.8 \leq a \leq 1.2$, $0.5 \leq b < 1$, $0 < c < 1$, $0 < d < 1$, $0 \leq e \leq 0.1$, $1 \leq f \leq 2$, and $0 \leq g \leq 1$, M is Mn, M' is selected from the group consisting of Zr, Al, Zn, Cu, Cr, Mg, Fe, V, Ti, and B, and A is selected from the group consisting of N, F, S, and Cl;

the negative active material is a silicon-oxygen compound particle and graphite; and the secondary battery satisfies:

$$7.5 \leq \frac{3460}{ED} - \left(D50 - D_C50 \times 0.75 - \frac{T}{18}\right) \leq 11.5,$$

where

270 Wh/Kg $\leq$ ED $\leq$ 320 Wh/Kg, 11 μm $\leq$ D50 $\leq$ 18.5 μm, 11 μm $\leq D_c50 \leq$ 20 μm, T is from 5 μm to 11 μm; and ED is a weight energy density of the secondary battery, measured in units of Wh/Kg;

D50 is a volume average particle size of the negative active material, measured in units of μm, $D_c50$ is a volume average particle size of the graphite, measured in units of μm, and T is a thickness of the substrate of the separator, measured in units of μm.

\* \* \* \* \*